United States Patent
McCurdy

[11] 3,729,109
[45] Apr. 24, 1973

[54] ASSEMBLY WITHIN A BRACKET FOR A PROJECTION SCREEN

[76] Inventor: Ronald E. McCurdy, 275 Jeffcoat Drive, Rexdale, Ontario, Canada

[22] Filed: June 14, 1971

[21] Appl. No.: 152,608

[52] U.S. Cl..................................248/487, 248/278
[51] Int. Cl. ................................................A47g 1/24
[58] Field of Search......................248/479, 486, 487, 248/454, 278, 414; 16/140

[56] References Cited

UNITED STATES PATENTS

| 2,636,112 | 4/1953 | Dvorsky | 248/414 |
| 2,591,318 | 4/1952 | Tomeo | 248/278 |
| 3,239,874 | 3/1966 | Sperzel | 16/140 |
| 3,485,471 | 12/1969 | McCurdy | 248/487 |

FOREIGN PATENTS OR APPLICATIONS

| 1,965,143 | 7/1970 | Germany | 248/278 |

Primary Examiner—Marion Parsons, Jr.
Attorney—George H. Riches

[57] ABSTRACT

A mounting device for supporting a rigid projection screen, constructed of low to medium density polyethylene or polypropylene and attachable to the back of said screen comprising a pair of spaced mounting blocks attachable to the back of the screen and a hinge pin journalled in said mounting blocks with an interference fit which resists relative rotative movement between the mounting blocks and the hinge pin and a wall bracket having one end fastened to the hinge pin and the opposite end attachable to a wall. This device utilizes the self lubricating quality of the construction material to allow a projector screen to which the device is attached to be moved from one position to another within limits about the axis of the hinge.

4 Claims, 2 Drawing Figures

Patented April 24, 1973  3,729,109

Inventor
Ronald E. McCurdy

By George H. Riches

Attorney

ASSEMBLY WITHIN A BRACKET FOR A PROJECTION SCREEN

BACKGROUND OF THE INVENTION

The present invention relates to a bracket having a rotatable hinge pin which can be used to support a rigid projection screen or the like and which allows the screen to be manually tilted within limits in response to a slight force from a fixed position about the axis of the hinge pin to another fixed position about the same axis.

United States Pat. No. 3,485,471 which issued Dec. 23, 1969 to Ronald E. McCurdy describes and claims a projector screen supporting assembly having a rotatable hinge pin which allows a projection screen, to which the assembly is attached, to be adjusted to correct image distortion due to the location of a projector used to project said image on the screen. This assembly is especially useful when it is necessary to locate the projector close to the screen, such as is commonly the case when an overhead projector is used in conjunction with the screen. However, the assembly depends on screw-threaded tightening elements secured on screw-threaded posts acting on spaced thrust bearings for maintaining slidable frictional resistance between the rotatable hinge pin and a slidable surface of the screen mounting structure forming part of the assembly which the hinge pin contacts in order to support the screen in a fixed position. Due to continuous adjustment or ambient vibration it becomes necessary to secure the tightening elements periodically to maintain this friction.

By utilizing the flexibility and self-lubricating qualities of low to medium density polyethylene or polypropylene, it has been surprisingly found that a support assembly bracket having a rotatable hinge pin can be made which does not require screw-threaded tightening elements securable on screw threaded posts acting on spaced thrust bearings for maintaining friction between the rotatable hinge pin and a slidable surface of a screen mounting structure, thereby eliminating the aforesaid disadvantages.

Therefore, it is an object of the present invention to provide an improvement in a bracket having a rotatable hinge pin used for supporting a rigid projection screen or the like.

It is a further object of the present invention to provide a bracket for a rigid projection screen and the like having a rotatable hinge pin which allows the bracket to support the screen in a fixed position and also when required to be manually tilted within limits about the axis of the hinge pin from this fixed position to another fixed position without resort to mechanical adjusting means.

It is another object of the present invention to provide such a bracket requiring no lubrication to maintain the hinge pin in operating condition.

It is still another object of the present invention to provide an assembly having a rotatable hinge pin which, when used in a bracket for supporting a rigid projection screen and the like, requires no lubrication to maintain the hinge pin in operating condition and which can be rotated manually without mechanical adjusting means about the axis of the hinge pin from one fixed position to another within limits.

These and other objects will become apparent from the following description of the preferred embodiment of the invention when considered in conjunction with the attached drawings.

IN THE DRAWINGS

IN THE DESCRIPTION

Figure 2:
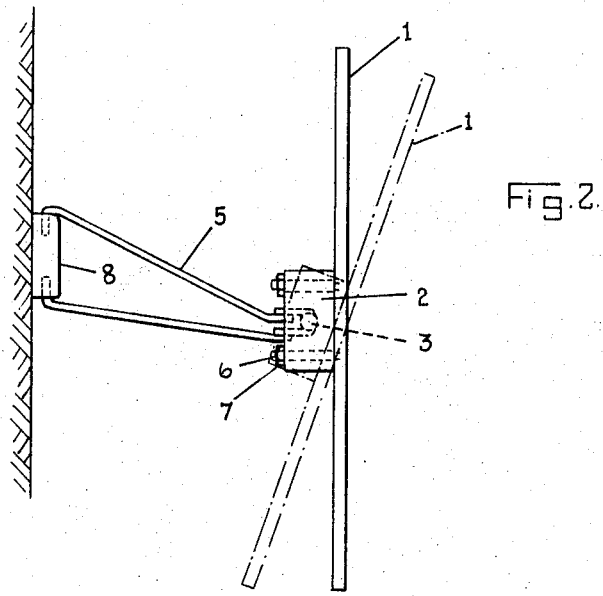
FIG. 2 is a schematic side view of a bracket using an embodiment of the invention which is mounted on a rigid projection screen at one end and attached to a wall of a room at the other end.
Figure 1:
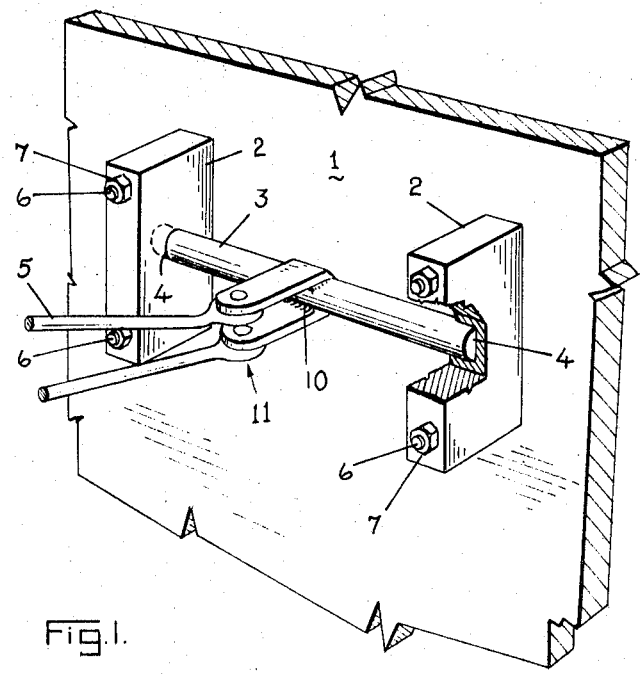
FIG. 1 is a fragmentary perspective view of a screen mounting structure assembly according to the invention, exposing partly one end of the rotatable hinge pin of said structure.

The assembly comprises a pair of mounting blocks 2 which are attachable to the back of the projection screen 1 by a suitable means, a hinge pin 3 journalled in the mounting blocks and mounting bracket 5 to which the hinge pin 3 is welded, substantially centrally between the ends of the pin 3, by welding 10 to prevent relative rotative movement between the pin and the bracket 5. The two spaced mounting blocks 2 are constructed of low to medium density polyethylene or polypropylene. By the term low to medium density polyethylene is meant polyethylene having a specific gravity of about 0.92 to about 0.96. The hinge pin 3 has been forceably inserted into the drilled holes 4 to provide a press fit between the pin and blocks, and also to permit the screen to be tilted as hereinafter described. The axis of each hole and the hinge pin 3 are in a single plane. In this way the hinge pin 3 is supported by the mounting blocks 2. The bracket 5 is attached to part of the hinge pin in the space between the mounting blocks 2 and can be attached to a supporting wall. In the illustrated embodiment the blocks 2 are mounted on the rigid projection screen by means such as threaded bolts 6 secured to the projection screen 1 by threaded nuts 7. The rigid projection screen 1 in this embodiment has female threaded holes into which the bolts 6 are received while the mounting blocks 2 have holes through which the bolts pass and beyond which the bolts extend sufficiently to allow the nuts 7 to be used to secure the screen to the blocks. These holes are located in the blocks so that they do not pass through or touch the circumference of the holes 4.

In FIG. 2 the rotatable hinge pin 2 is attached to the supporting wall 8 by means of the bracket 5. Because the holes 4 are drilled so that the hinge pin 3 must be forceably inserted into the mounting blocks 2 the screen 1 is held fixedly in any position. However, to move it to another fixed position such as that shown by the broken lines and referred to as 1', it is only necessary to manually tilt the screen. As mentioned it has been found that because of the self-lubricating properties of low to medium density polyethylene only a slight force is necessary to move the rigid projection screen mounted in this manner from one fixed position to another. It can be seen that the movement about the hinge pin 3 is limited since when the screen 1 is tilted to that it contacts the arm 5 further tilting in the same direction is prevented by said arm. Also, if the arm 5 is short, the screen can be restricted in movement by the supporting wall 8.

It should be understood that the invention is not limited by this preferred embodiment and that other embodiments should be obvious from this description. For example instead using nuts and bolts to attach the mounting blocks to the rigid projection screen an adhesive suitable for bonding polyethylene to the material of which the rear of the projection screen is constructed, can be used. Also, the hinge pin can be made of a weldable steel so that the means for attaching the assembly to a supporting wall can be welded to the hinge pin by a welded joint 10.

The bracket 5 can include means 11 which together with the hinge pin 3 is capable of allowing a rigid projection screen to be laterally or vertically moved within limits about the respective axis and is capable of supporting the screen, when the assembly is attached to the back of the screen and the supporting wall. Said means 11 can be a universal joint attached to the bracket 5. Further, the bracket 5 may be swingingly attachable to a supporting wall so that the screen can be folded against the wall when the assembly is attached to the back of the screen and the supporting wall.

What I claim is:

1. A mounting assembly for supporting a rigid projection screen comprising:
   a. a pair of spaced mounting blocks constructed of a material selected from the group consisting of low to medium density polyethylene and polypropylene attachable to the back of the screen in spaced apart relationship,
   b. a hinge pin journalled in said mounting blocks with an interference fit which resists relative rotative movement between the mounting blocks and the hinge pin, the hinge pin being formed of a material substantially harder than the material of which the blocks are formed, and
   c. a wall bracket having one end fastened to the hinge pin and the opposite end attachable to a supporting wall, whereby the screen is retained at any angle of tilt to which it is manually moved.

2. The assembly of claim 1 in which the hinge pin is constructed of steel.

3. The assembly of claim 1 in which the bracket includes joint means which together with the hinge pin is capable of allowing the screen to be laterally or vertically tilted within limits when the assembly is attached to the back of the screen and the supporting wall.

4. The assembly of claim 1 which is swingingly attachable to a supporting wall.

* * * * *